(12) United States Patent
Hamlin

(10) Patent No.: US 6,772,281 B2
(45) Date of Patent: Aug. 3, 2004

(54) DISK DRIVE FOR SELECTIVELY SATISFYING A READ REQUEST FROM A HOST COMPUTER FOR A FIRST VALID DATA BLOCK WITH A SECOND VALID DATA BLOCK

(75) Inventor: Christopher L. Hamlin, Los Gatos, CA (US)

(73) Assignee: Western Digital Ventures, Inc., Lake Forest, CA (US)

( * ) Notice: Subject to any disclaimer, the term of this patent is extended or adjusted under 35 U.S.C. 154(b) by 0 days.

(21) Appl. No.: 09/507,121

(22) Filed: Feb. 17, 2000

(65) Prior Publication Data

US 2002/0166024 A1 Nov. 7, 2002

(51) Int. Cl.[7] .............................................. G06F 12/00
(52) U.S. Cl. ....................... 711/112; 711/111; 711/202; 711/206
(58) Field of Search ........................ 711/112, 111, 202, 711/206; 713/2; 714/710

(56) References Cited

U.S. PATENT DOCUMENTS

| | | | | |
|---|---|---|---|---|
| 4,814,903 A | * | 3/1989 | Kulakowski et al. ......... 360/48 |
| 5,307,497 A | | 4/1994 | Feigenbaum et al. | |
| 5,345,347 A | | 9/1994 | Hopkins et al. | |
| 5,586,301 A | | 12/1996 | Fisherman et al. | |
| 5,657,473 A | | 8/1997 | Killean et al. | |
| 5,675,795 A | * | 10/1997 | Rawson, III et al. ....... 395/652 |
| 5,883,864 A | * | 3/1999 | Saliba ......................... 369/30 |
| 5,887,163 A | * | 3/1999 | Nguyen et al. ............. 395/652 |
| 5,978,912 A | | 11/1999 | Rakavy et al. | |
| 6,178,503 B1 | * | 1/2001 | Madden et al. ................. 713/2 |
| 6,185,678 B1 | * | 2/2001 | Arbaugh et al. ............... 713/2 |
| 6,192,471 B1 | * | 2/2001 | Pearce et al. .................. 713/2 |
| 6,324,660 B1 | * | 11/2001 | Majima et al. ............. 714/710 |
| 6,332,204 B1 | * | 12/2001 | Russell ........................ 714/710 |
| 6,397,229 B1 | * | 5/2002 | Menon et al. .............. 707/204 |

FOREIGN PATENT DOCUMENTS

WO    WO 99/59049 A1    11/1999

OTHER PUBLICATIONS

Brain, Marshall, "How Microprocessors Work"; www.howstuffworks.com/microprocessor.htm/printable; Dec. 12, 2001; pp. 1–3.

"Super10 DSP Microcontroller Core"; http://us.st.com/stonline/prodpres/dedicate/super10/super10.htm; Dec. 12, 2001; pp. 1–2.

* cited by examiner

*Primary Examiner*—Kimberly McLean-Mayo
(74) *Attorney, Agent, or Firm*—Milad G. Shara, Esq.; Robroy Fawcett, Esq.; Burns Doane Swecker & Mathis

(57) ABSTRACT

The present invention is directed to a disk drive which can assert control over the information content supplied in response to a read request from the host by performing a selective translation of addresses received from the host. The disk drive can include hardware, firmware, or a combination thereof, to unambiguously detect a command block to read a predetermined location on the drive. The drive, upon detecting occurrence of a predetermined address included in the command block, translates the address to initiate a read from an alternate, substitute location information stored at the substitute location is returned to the requesting host in satisfaction of the host's request. The information can be blocks of data, such as audio/video data, or can be executable code including, but not limited to, code used to boot a substitute operating system stored at a location known only to the drive.

36 Claims, 3 Drawing Sheets

DISK DRIVE FOR SELECTIVELY SATISFYING A READ REQUEST FROM A HOST COMPUTER FOR A FIRST VALID DATA BLOCK WITH A SECOND VALID DATA BLOCK

BACKGROUND OF THE INVENTION

1. Field of the Invention

The present invention relates generally to digital information storage, and more particularly, to a disk drive having control means for responding to a read request from a host computer.

2. Background Information

As the design of disk drives has evolved, areal density improvements have outpaced most users' near term ability to consume the storage capacity thus afforded. In addition, disk drives are equipped with microprocessor based controllers which allow for programmable functions to be incorporated in the drive. Because of the ubiquitous presence of disk drive-equipped personal computers that are connected to the internet, numerous efforts are being made by business entities to solicit personal computer users for purchase of goods and services. To date these efforts have not fully exploited the bountiful capacity and programmability of disk drives.

Conventional accessing of information on a disk media of a disk drive is exclusively controlled by a host computer, which issues read commands to the drive. In response to a read command for information stored on the disk media, the information requested is retrieved by the disk drive and returned to the host.

Accesses to the disk media are executed by the disk drive in a manner whereby information content expected by the host is returned to the host. However, because disk accesses are executed by the drive, the exact physical location of the disk accessed is not known to the host. For example, information storage management techniques embedded in the drive can include translating each logical block address (LBA) received from the host into a corresponding physical location on the drive represented as a cylinder/head/sector (CHS) location of the disk media. The LBAs are a sequence of addresses which correspond one-for-one to physical locations on the disk, but which need not correspond in sequence to the physical order of cylinder/head/sector locations on the disk. Thus, in a typical access, an LBA is issued by the host, and converted to a corresponding CHS so that expected information can be returned to the host.

In some special situations, a host computer attempt to access a physical CHS target location on the disk media which corresponds to a given LBA can result in an alternate CHS location of the disk being accessed by the drive for a variety of reasons. However, in these cases, the alternate location contains the original information expected by the host. For example, a particular sector of the drive which corresponds to the initial LBA may have become faulty (i.e., flawed, missing or otherwise unreadable), such that the access may be redirected to another mirrored sector where the identical information has been redundantly stored. Although it is known to provide a disk drive with a system for recovering information from the faulty sector using a combination of techniques including on-the-fly error correction in hardware, retries with varying parameters or head position, or a "heroic" mode whereby more extensive processing is used, some locations are simply unrecoverable.

Mirrored sectors are also used to improve the efficiency with which information is read from the disk media. For example, it is known to direct a read head of the disk drive to one of plural mirrored sectors which is closest in proximity to the location of the read head immediately prior to the read operation, thereby improving the speed with which the information stored in the mirrored sector is retrieved. The mirrored sectors are accessed by the host using the same LBA, even though the two identical sets of information are recorded at different physical (CHS) locations.

Thus, the information content supplied to the host in response to read requests is performed under control of the host. This host control begins immediately with a boot-up process. Basic operations associated with the booting up of a computer, under the control of the host, are described in U.S. Pat. No. 5,307,497, and in U.S. Pat. No. 5,978,912, the disclosures of which are hereby incorporated by reference in their entirety.

U.S. Pat. No. 5,307,497 describes a data processing system, such as a personal computer, which contains bootable DOS programs stored in a read-only memory. When the system is powered on, the programs are booted up, or loaded from the read-only memory into a random access memory, and instantly executed to place the system into operation. The read-only memory includes a basic input/output system (BIOS) and a power on self-test routine (POST). When the system power is first activated, or when the system is restarted, the POST performs the test and upon successful completion, boots a portion of a disk operating system (DOS) to transfer control to it. The system, under control of the host, looks to a fixed location in memory for a boot routine which loads the DOS kernel and starting system with a shell program.

U.S. Pat. No. 5,978,912 describes a similar boot process. Upon start-up or system reset, the POST of the host's BIOS performs a hardware initialization. The POST then reads data from a predetermined location of a memory device, such as a disk drive, to load a boot strap loader program which in turn loads a larger program into memory. The larger program initializes the operating system.

Thus, the booting process is a fixed operation which begins with the host accessing a predetermined location of a disk drive connected to the host computer. Thereafter, read operations are performed under control of the operating system at the request of the host, and in satisfaction of information content expected by the host. There is a need therefore for a disk drive which is equipped to support a richer mix of business activities with personal computer users.

SUMMARY OF THE INVENTION

The present invention is directed to a disk drive which can assert control over the information content supplied in response to a read request from the host by performing a selective translation of addresses received from the host. The disk drive can include hardware, firmware, or a combination thereof, to unambiguously detect a command block from the host to read information from a predetermined location on the drive. The drive, upon detecting occurrence of a predetermined address included in the command block, translates the address to initiate a read from an alternate, substitute location. Information stored at the substitute location is returned to the requesting host in satisfaction of the host's request. The information can be blocks of data, such as audio/video data, or can be executable code including, but not limited to, code used to boot a substitute operating system stored at a location known only to the drive.

Thus, the present invention is directed to a disk drive connectable to a host computer, comprising interface means for receiving a read request from the host computer referencing a first valid data block stored in a first block storage location on a disk of the disk drive; and control means for selectively satisfying the read request with a second valid data block stored in a second block storage location, wherein the first and second data blocks are different in content from each other. As referenced herein a "valid" data block is a block of data on the drive which can be recovered and sent to the host using normal drive processing such as retries and error correction techniques. The control means can include a memory device and a microprocessor. The memory device includes a translation map for translating a predetermined reference to the first block storage location to a reference to the second block storage location.

The microprocessor is connected to the interface means and to the memory device to control storage of the translation map from the interface means into the memory device.

The memory device can include a translation enable/disable register for selectively enabling access to the translation map. The microprocessor controls storage of the translation enable/disable register in the memory device.

The microprocessor can store the translation map in response to an encrypted command, the control means including a decryption algorithm. The decryption algorithm can be stored in the memory device.

The first and second data blocks differ in content by at least a single bit. The first data block can be in a first range of data blocks addressed by the read request, and the second data block can be in a second range of data blocks, the first and second ranges of data blocks differing in content by at least a single bit. The first and second valid data blocks can, for example, represent executable code. In one example, the first valid data block corresponds to a boot sector on the disk, while in another example, the first and second valid data blocks correspond to audio/video information.

DETAILED DESCRIPTION OF THE PREFERRED EMBODIMENTS

Figure 1:
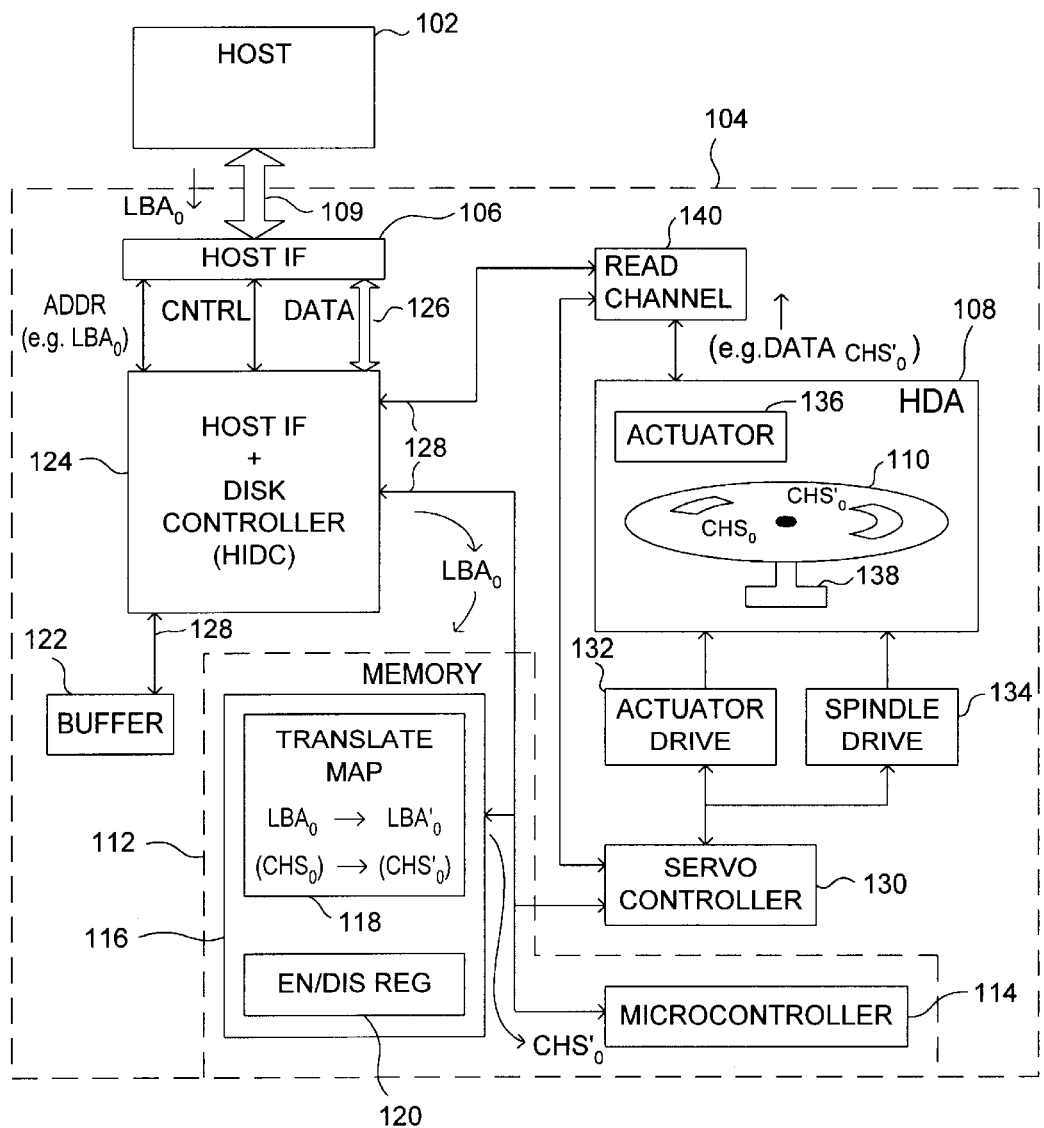
FIG. 1 is an exemplary system implemented in accordance with the present invention.

FIG. 1 illustrates a system which includes a disk drive 104 connectable to a host computer 102. The FIG. 1 disk drive 104 includes an interface means, represented as a host interface 106 for receiving a read request from the host computer via a transmission path represented as a bus 109 that interconnects the host computer to the drive. The host computer and host interface can, for example, be implemented in a manner as described in U.S. Pat. No. 5,345,347 entitled "Disk Drive With Reduced Power Modes", the contents of which are hereby incorporated by reference. The read request includes an $LBA_0$ which either directly, or indirectly (e.g., implicitly, using an offset) references at least a first valid data block storage location on a disk of the disk drive, such as the data located at a physical location $CHS_0$ on disk 110 of head disk assembly (HDA) 108. The data block corresponds to one or more bytes stored on the disk 110. Those skilled in the art will appreciate that the specific format of the address can be in accordance with any format desired by the user. For example, the address from the host can be an LBA which is converted by disk drive 104 into a corresponding CHS address in known fashion. Alternately, any other address scheme can be used including, but not limited to, use of a byte offset to designate a storage location on the disk 110 which is to be read or written.

The disk drive 104 also includes control means 114 for selectively satisfying the read request for the first data block with a second data block stored at a second block storage location of the disk 110, such as location $CHS'_0$. The first and second data blocks are different in content from each other.

The control means can, for example, be implemented as hardware, firmware, or any combination thereof. In the FIG. 1 example, the control means includes a microcontroller 114 configured using any conventional microprocessor, including but not limited to those described in U.S. Pat. No. 5,345,347. The microcontroller can be programmed to exclusively setup and perform address translation functions in accordance with the present invention, or can be configured to implement these functions in conjunction with other functions of the drive including drive scheduling functions and functions described with respect to the disk drive microcontroller disclosed in U.S. Pat. No. 5,345,347.

The control means 112 also includes a memory device 116 configured as an EPROM, ROM, RAM or any other desired memory structure. The memory device 116 includes a translation map 118 which can be configured and stored using a setup mode by the microcontroller 114 in response to commands from the host computer 102, or can be a fixed map stored in the memory device beforehand. The memory device 116 optionally includes a register 120 for storing a flag to indicate when the translation function which invokes the translation map is to be enabled or disabled. Of course, any or all of the information stored in the memory device 116 can be stored in any other memory device of the disk drive including, but not limited to, a buffer memory 122 and/or the disk 110 itself. Thus, the physical location of the alternate data block can be fixed as an immutable property of the drive, or can be determined through a configuration mechanism of the drive which is invoked subsequent to the manufacture of the drive. The invention encompasses the provision of any information from any alternate valid location on the disk media whose content is substituted for the content of the location whose address was presented at the interface 106 by the host.

In addition to the control means and the interface means, which can be directly interfaced to one another, the FIG. 1 disk drive 104 also includes a host interface and disk controller (HIDC) 124. The HIDC provides control and information paths between the host 102 and host interface 106 to remaining components of the disk drive via a bus 126 (e.g., including address, control and data lines), and a bus 128. The bus 128 also connects the HIDC with the buffer memory 122, the buffer memory being provided primarily to accommodate different data flow rates between the HIDC and host and HIDC and drive. The mechanical drive control of the disk 110 is performed, in an exemplary embodiment, through interaction of the HIDC 124, the microcontroller 114, a servo-controller 130, an actuator drive 132 and a spindle drive 134. The actuator drive 132 controls an actuator 136 configured, for example, as a voice coil motor, for positioning a read head over a particular CHS location on the disk 110. The spindle drive is connected with a spindle motor 138 to rotate the disk.

Information read from or written to the disk 110 passes through a read channel 140 which, for example, includes a data separator and pulse detector as described in U.S. Pat.

No. 5,345,347. For example, during a read operation, information retrieved from the disk is supplied through the read channel 140 to the HIDC 124, under scheduling control of the microcontroller 114. The information can be buffered in buffer 122, and then transferred to the host via the host interface 106.

The disk drive 104 is configured such that its internal behavior involves detecting the presence at the interface 106 of a reference to a predetermined location (e.g., sector) on the disk 110. In response, the drive causes an alternate physical location on the disk media, possessing a different address and different content (e.g., at least one bit different), to be substituted for the location that would have been accessed by the initial address presented at the interface. Those skilled in the art will appreciate that the address which the disk drive 104 monitors for a match to the range of addresses included in the translate map, can be an address to a single block, or can be an address to a single block which is implicitly linked to a plurality of blocks. In either case, the difference between the target data block(s) requested by the host and the substitute alternate data block(s) actually retrieved and returned to the host, can be a single bit. In an exemplary embodiment of the present invention, the operation of address substitution, and providing alternate content in response to a particular host request, is carried out by the disk drive transparently, without modification to the host system.

In one embodiment, the translation map of the disk drive is used to recognize the boot sector address during a startup or reset of the host. The boot sector is a reserved location on the drive which is known in advance to the host. The BIOS in the system reads the boot sector on a selected boot device. The location and organization of the boot sector is an industry standard which is rigidly defined, and not subject to alteration and layout because the BIOS-resident boot code is set up with hard coded expectations with respect to the location and structure of the boot sector. The boot sector governs the behavior of the overall system when control passes from the POST BIOS code. Upon execution, the boot sector code reads in other code which is used to initiate a layered process of moving the operating system code from its resident location into system memory of the host.

However, in accordance with exemplary embodiments of the present invention, the disk drive can be configured to recognize when the boot sector is being addressed by the host, and in response thereto, can substitute a different address whereby alternate executable code (e.g., an alternate operating system) can be booted. As such, the drive can assert autonomous control over the boot process by substituting another sector's content for the expected boot sector content.

The disk drive is not limited to substituting alternate executable code, but rather can be configured to include a facility for detecting the presence of requests referencing any predetermined storage location of the disk (e.g., a location storing data representing audio/video information to be displayed on the host monitor) and in response thereto, substitute content selected by the drive's translation map. Those skilled in the art will appreciate that rather than having a single alternate assignment, multiple alternate assignments of a given storage location referenced by the host can be provided, and accessed by the disk drive selectively in accordance with any selection mechanism desired (e.g., use timeout features to dictate which alternate location is to be selected).

Figure 2A:
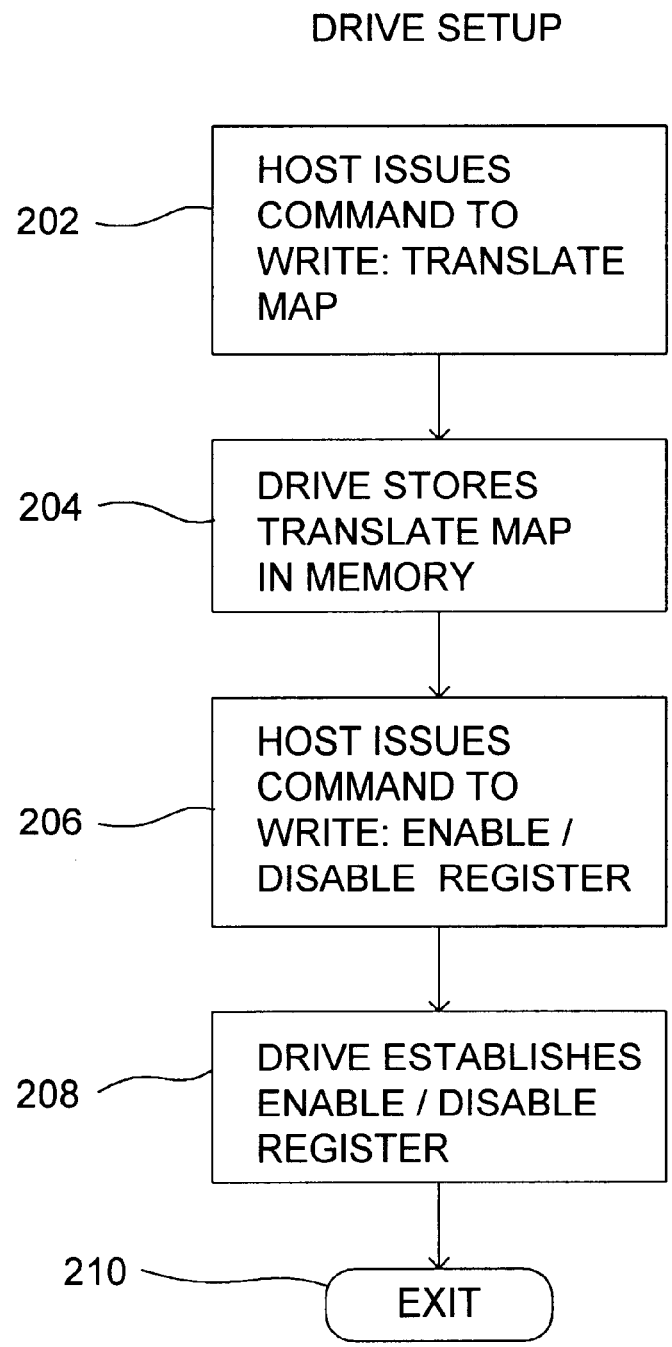
FIGS. 2A and 2B are flow charts illustrating exemplary setup and operation of the FIG. 1 system.

Operation of the FIG. 1 disk drive will be described in conjunction with FIGS. 2A and 2B. FIG. 2A illustrates an exemplary set-up operation of the drive with respect to features implemented in accordance with the present invention; namely, the configuration and storage of a translation map and enable/disable register. In step 202, the host issues a command to write to the disk drive information regarding a translation map configuration. In step 204, the drive stores the translation map in a memory, such as the memory device 116. At this time, specific predetermined LBAs to be recognized, and the LBAs to which they are translated, can also be stored. Those skilled in the art will appreciate that the translation map can either translate from a first LBA to another LBA' or CHS', or the translate map can receive a physical CHS location, after the LBA has been converted by the microcontroller 114 into a physical location, for translation into an alternate CHS' location.

Where an ability to selectively enable or disable activation of the translate mode is desired, the host can issue a command, as represented in block 206, to the drive to write the enable/disable register. In the FIG. 1 embodiment, this register is written in the memory device 116 as the enable/disable register 120. Step 208 of FIG. 2A illustrates the establishment of this register, which can be accessed by a predetermined command from the host. After having established the translation map and optional enable/disable register, the drive setup, as modified in accordance with exemplary embodiments of the present invention, is complete (as represented by the exit block 210 in FIG. 2A).

Those skilled in the art will appreciate that the command issued by the host to write the translation map and/or the enable/disable register, and commands to store information in the translation map and to toggle the enable/disable register between its enable and disable states, can be protected commands not made readily available to the public. For example, the commands can be native commands known only to the disk drive manufacturer, and supplied only to original equipment manufacturers (OEM) of the host to inhibit falsification or tampering with information stored in the translation map. Alternately, or in addition, the commands used to perform these functions can be encrypted using an algorithm known only to the disk drive manufacturer and/or OEM of the host computer, the encryption being performed using any known encryption algorithm or technique. Decryption can be performed by the drive using, for example, a decryption algorithm stored in the memory device 116, or any other location.

After the disk drive has been configured to perform a translation function as described in accordance with the present invention, the drive operation can be performed in such a manner that the drive will selectively substitute certain alternate, substitute information for information which the host expects to receive during normal operation. This alternate, substitute information can be written to the disk in a protected mode of operation, and in locations known only to the disk drive manufacturer, or to any specified locations desired. Once data is stored in the selected alternate, substitute locations on the drive, and the translation map has been stored and enabled, the disk drive will operate to access the alternate, substitute locations when it detects the occurrence of a predetermined address at the host interface 106.

Figure 2B:
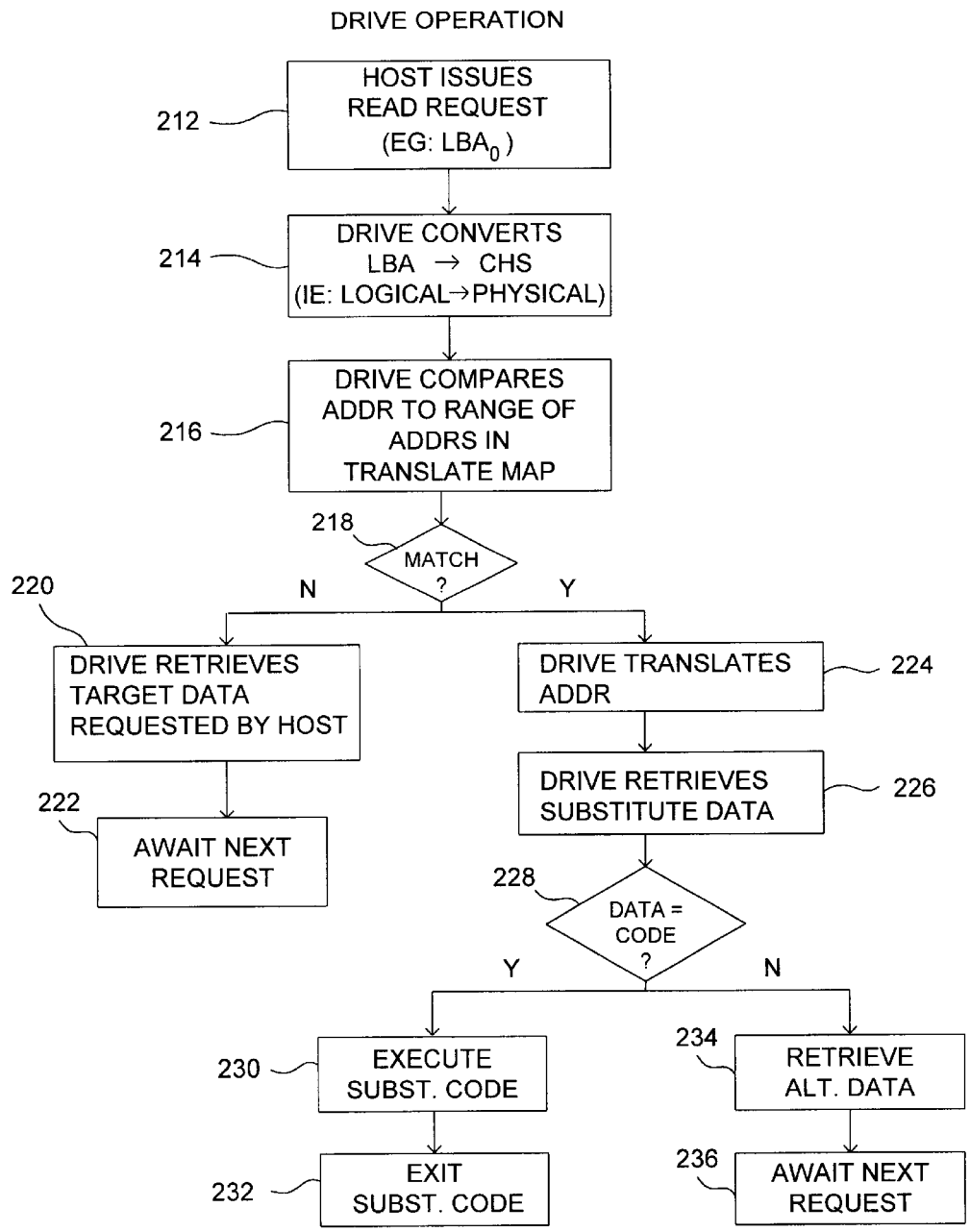

FIG. 2B illustrates an exemplary operation of the FIG. 1A disk drive in accordance with the present invention. In step 212, the host issues a read request to the host interface 106. In an exemplary embodiment, the read request includes an address represented as $LBA_0$. In step 214, the microcontroller 114 oversees the conversion of the $LBA_0$ into a physical $CHS_0$ location.

In step 216, the drive compares $LBA_0$ or, where physical locations are to be used by the translate map, $CHS_0$ to determine whether the address falls within a range of addresses included in the translation map 118. If not, the drive 104 simply retrieves the target data requested by the host in conventional fashion, as represented by decision block 218 and step 220 of FIG. 2B. After processing the request, the disk drive awaits the next request as represented by step 222.

However, if a match does exist with respect to the range of addresses included in the translation map, then the microcontroller 114, in conjunction with the translation map 118, translates the address into an alternate substitute address (e.g., $LBA'_0$) as represented by step 224. The microcontroller, in conjunction with the servo-controller 130 and read channel 140, then retrieves a data block stored at the substitute alternate location (physical location $CHS'_0$) from the disk 110 as represented by step 226.

In accordance with exemplary embodiments, the present invention can be used to simply retrieve substitute information for information requested by the host, or can be used to retrieve executable code or to retrieve an address to executable code. Where the substitute data involves executable code, the code is accessed and executed as represented by decision block 228 and step 230. Upon completion of the code execution, it is exited in step 232 and operation of the host returns to normal processing. However, where the substitute data is simply alternate data, such as alternate data to be displayed on a monitor of the host 102, the data is retrieved in step 234 for delivery to the host. The drive then awaits the next request from the host, as represented by step 236.

I claim:

1. A disk drive connectable to a host computer, comprising:
   interface means for receiving a read request from the host computer referencing a first valid data block stored in a first block storage location on a disk of the disk drive; and
   control means for selectively satisfying the read request with a second valid data block stored in a second block storage location, wherein the first and second data blocks are different in content from each other, and the content of the second valid data block is not generated by the disk drive based on any portion of the content of the first valid data block.

2. Disk drive according to claim 1, wherein the control means includes:
   a memory device; and
   a microprocessor.

3. Disk drive according to claim 2, wherein the memory device includes: a translation map for translating a reference to the first block storage location into a reference to the second block storage location.

4. Disk drive according to claim 3, wherein the microprocessor is connected to the interface means and to the memory device to control storage of the translation map from the interface means into the memory device.

5. Disk drive according to claim 3, wherein the memory device includes a translation enable/disable register for selectively enabling access to the translation map.

6. Disk drive according to claim 5, wherein the microprocessor controls storage of the translation enable/disable register in the memory device.

7. Disk drive according to claim 4, wherein the microprocessor stores the translation map in response to an encrypted command, the control means including a decryption algorithm.

8. Disk drive according to claim 7, wherein the decryption algorithm is stored in the memory device.

9. Disk drive according to claim 1, wherein the first and second data blocks differ in content by at least a single bit.

10. Disk drive according to claim 1, wherein the first data block is in a first range of data blocks addressed by the read request, and the second data block is in a second range of data blocks, the first and second ranges of data blocks differing in content by at least a single bit.

11. Disk drive according to claim 1, wherein the first and second valid data blocks represent executable code.

12. Disk drive according to claim 11, wherein the first valid data block corresponds to a boot sector on the disk.

13. Disk drive according to claim 1, wherein the first and second valid data blocks correspond to audio/video information.

14. Method for operating a disk drive connectable to a host computer, comprising the steps of:
   receiving a read request including an address for referencing a first valid data block stored in a first block storage location on a disk of the disk drive; and
   selectively satisfying the read request with a second valid data block stored in a second block storage location, wherein the first and second data blocks are different in content from each other, and the content of the second valid data block is not generated by the disk drive based on any portion of the content of the first valid data block.

15. A method for operating a disk drive as defined in claim 14, wherein the step of selectively satisfying the read request includes translating a reference to the first block storage location to a reference to the second block storage location.

16. A method for operating a disk drive as defined in claim 14, wherein the first and second data blocks differ in content by at least one bit.

17. A method for operating a disk drive as defined in claim 14, wherein the first data block is in a first range of data blocks addressed by the read request, and the second data block is in a second range of data blocks, the first and second ranges of data blocks differing in content by at least a single bit.

18. A method for operating a disk drive as defined in claim 14, wherein the first and second valid data blocks represent executable code.

19. A method for operating a disk drive as defined in claim 18, wherein the first valid data block corresponds to a boot sector on the disk.

20. A method for operating a disk drive as defined in claim 14, wherein the first and second valid data blocks correspond to audio/video information.

21. A system, comprising:
   a host computer; and
   a disk drive connected to the host computer, the disk drive having an interface means for receiving a read request from the host computer referencing a first valid data block stored in a first block storage location on a disk of the disk drive, and a control means for selectively satisfying the read request with a second valid data block stored in a second block storage location, wherein the first and second data blocks are different in content from each other, and the content of the second valid data block is not generated by the disk drive based on any portion of the content of the first valid data block.

22. A system as defined in claim 21, wherein the control means includes a memory device and a microprocessor.

23. A system as defined in claim 22, wherein the memory device includes a translation map for translating a reference to the first block storage location into a reference to the second block storage location.

24. A system as defined in claim 23, wherein the microprocessor is connected to the interface means and to the memory device to control storage of the translation map from the interface means into the memory device.

25. A system as defined in claim 23, wherein the memory device includes a translation enable/disable register for selectively enabling access to the translation map.

26. A system as defined in claim 25, wherein the microprocessor controls storage of the translation enable/disable register in the memory device.

27. A system as defined in claim 24, wherein the microprocessor stores the translation map in response to an encrypted command, the control means including a decryption algorithm.

28. A system as defined in claim 27, wherein the decryption algorithm is stored in the memory device.

29. A system as defined in claim 21, wherein the first and second data blocks differ in content by at least a single bit.

30. A system as defined in claim 21, wherein the first data block is in a first range of data blocks addressed by the read request, and the second data block is in a second range of data blocks, the first and second ranges of data blocks differing in content by at least a single bit.

31. A system as defined in claim 21, wherein the first and second valid data blocks represent executable code.

32. A system as defined in claim 31, wherein the first valid data block corresponds to a boot sector on the disk.

33. A system as defined in claim 21, wherein the first and second valid data blocks correspond to audio/video information.

34. A method for operating a disk drive as defined in claim 14, wherein the step of selectively satisfying the read request with a second valid data block stored in a second block storage location comprises transferring the second valid data block to the host computer.

35. A disk drive, comprising:

a memory device having a first block storage location for storing a first valid data block, and having a second block storage location for storing a second valid data block, wherein the first valid data block differs in content from the second valid data block, and the content of the second valid data block is not generated by the disk drive based on any portion of the content of the first valid data block; and state means for defining a first state for normal disk-drive response in which a read request from a host computer referencing the first block storage location is satisfied by transferring the first valid data block to the host computer, and for defining a second state for alternate disk-drive response in which a read request from a host computer referencing the first block storage location is satisfied by transferring the second valid data block to the host computer;

whereby the disk drive controls, based on the state of the state means, the content transferred to the host computer for satisfying the read request referencing the first block storage location.

36. A disk drive, comprising:

a memory device having a first block storage location for storing a first valid data block that represents host-expected information content, and having a second block storage location for storing a second valid data block that represents alternate information content, wherein the host-expected information content, when read error free, differs in content from the alternate information content, when read error free, and wherein the content of the second valid data block is not generated by the disk drive based on any portion of the content of the first valid data block; and state means for defining a first state for normal disk-drive response in which a read request from a host computer referencing the first block storage location is satisfied by transferring the first valid data block that represents the host-expected information content to the host computer, and for defining a second state for alternate disk-drive response in which a read request from a host computer referencing the first block storage location is satisfied by transferring the second valid data block that represents the alternate information content to the host computer;

whereby the disk drive controls, based on the state of the state means, the information content transferred to the host computer for satisfying the read request referencing the first block storage location.

* * * * *